May 2, 1933.  L. JOHNSON  1,906,380
HOSE HOLDER
Filed July 29, 1932
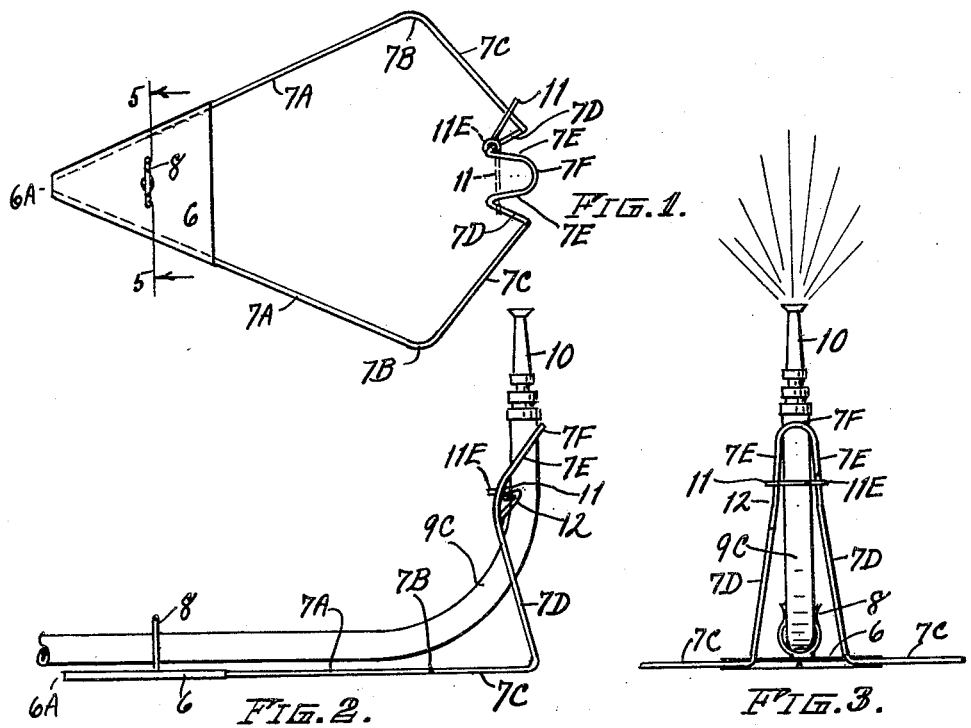
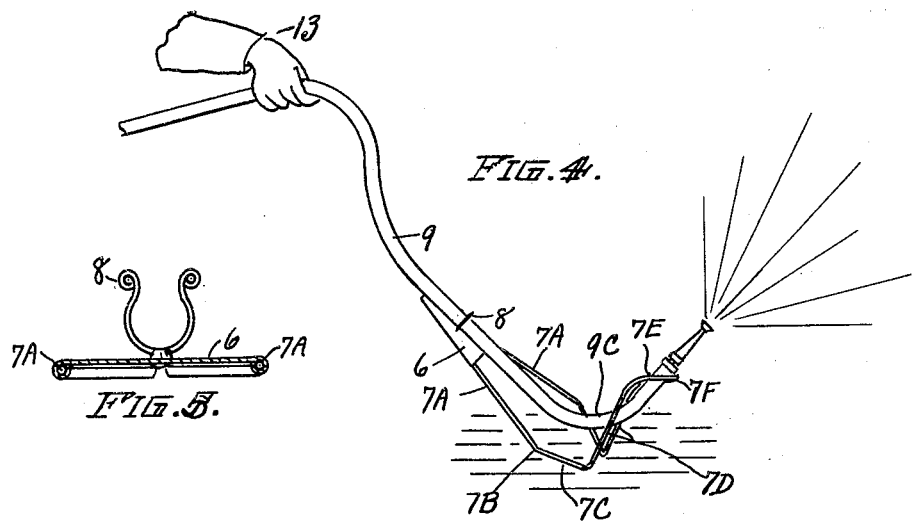
INVENTOR:
Louis Johnson
BY David E. Carlsen
ATTORNEY Patented May 2, 1933

1,906,380

UNITED STATES PATENT OFFICE

LOUIS JOHNSON, OF ST. PAUL, MINNESOTA

HOSE HOLDER

Application filed July 29, 1932. Serial No. 626,188.

My invention relates to a hose and nozzle holding device for lawn and garden watering purposes.

The main object is to provide a simple, highly efficient and inexpensive hose holder adapted to be readily moved from place to place, the device being of exceptionally light but sturdy construction involving mainly a single piece of heavy wire and means for securely but removably retaining a garden hose and its nozzle in such position that a lawn is efficiently sprinkled with a minimum of effort.

Further objects and advantages are hereinafter fully set forth reference being had to the accompanying drawing, in which,—

Fig. 1 is a top view of my improved hose holder.

Fig. 2 is a side elevation of Fig. 1 including a lawn hose and its nozzle in lawn spraying position in the holder, and Fig. 3 is a front view of Fig. 2.

Fig. 4 is a perspective view of the device tilted by a hand grasping the hose near the device for moving it.

Fig. 5 is an enlarged transverse sectional detail view as on line 5—5 in Fig. 1.

Referring to the drawing by reference numerals 6 designates a flat sheet metal plate of trinagular form the apex of which is rearward and the two opposite sides or edges thereof beaded to inclose the rear end parts 7A of a wire frame said parts 7A projecting forward from the plate 6 in diverging straight lines, in a common plane with the plate, to a bend 7B thence in forward angular plane toward each other as two arms 7C also in common plane with arms 7A and plate 6.

The forward extremities of arms 7C are in transversely spaced relation and both bent upward in tapered relation to form a goose neck the lower half 7D of which is in upright but rearwardly inclined plane and the upper half 7E is also upright but in a forwardly inclined plane and its upper extremity comprising the rearwardly opening half-loop 7F where the wire of the two arms is formed integral. In other words the wire frame is a single integral piece of preferably heavy wire extending in the form described from the upper terminus of the goose neck downwardly to the diverging arms 7C thence converging toward the plate 6 and its rear ends retained in the side parts of the plate. The goose neck is central of the front part of the device and in alinement with the apex 6A or rear end of plate 6.

Approximately at the center of plate 6 and on its top is fixed an upwardly opening spring metal jaw member 8 in which may be removably and frictionally retained a lawn hose 9 extending forwardly therefrom, centrally of the frame, and curved upwardly as at 9C with its nozzle retaining end arranged vertically between arms 7E and bearing against the inner part of 7F, with the nozzle 10 above said part 7F in vertical position. 11 is a hose locking bar with an eye part 11E pivotally engaging one arm of the goose neck at its forwardly bent part intermediate the upper and lower ends of the goose neck. This arm is swung around rearward of the hose to the dotted line position shown in Fig. 1 to retain the forward upright part of the hose in said upright position. The free end of the bar 11 may be removably retained in a fixed upwardly notched catch 12 on the arm of the goose neck opposite to the arm on which the bar is pivoted (see Figs. 2 and 3).

With the nozzle end of a garden hose retained in the device as above described and best illustrated in Fig. 2, with the nozzle positioned opening upwardly, the operator merely adjusts the said nozzle as desired for spraying and the water is turned on. No special type of nozzle or sprayer is required as an ordinary adjustable type will suffice.

When an area of lawn has been sufficiently sprinkled or sprayed an operator simply grasps the hose 9 with a hand 13 (Fig. 4) rearward of the device, raises said part of the hose and causing the holder to be tilted forward for dragging the entire device rearward to a new location. Or the operator may lift the entire device off the ground and freely move it to any location desired while the spray is in operation.

Removal of the hose from the device is extremely simple, the operator merely unlatching member 11 leaving the nozzle end of the hose free to be removed from the goose-neck and the rearward or horizontal part of the hose is readily removed from the holding member 8 on plate 6.

It is obvious that in moving the device from place to place as in Fig. 4 it is skidded along on the ground, contact being made only at the two parts of the frame at the base of the goose neck where it connects with arms 7B.

I claim:

A hose holder of the class described comprising an elongated flat base tapered rearwardly and forwardly, an upright member formed integrally thereof in the forward end and consisting of a single integral wire bent forward and downward from a half-loop at its upper extremity in two arms extending further down in a forward inclined plane to form a goose-neck arranged to frictionally retain the nozzle end of a hose in vertical position between the arms of said neck part, and locking means on said neck at its curvature to further retain said hose end upright, said locking means comprising a bar pivotally secured to one arm of the goose neck intermediate its ends and adapted to span the goose neck horizontally and means for removably retaining the said bar adjacent to the other arm of the goose neck, to engage the rearward side of a hose retained vertically in the upper part of said goose neck.

In testimony whereof I affix my signature.

LOUIS JOHNSON.